United States Patent [19]

Geller

[11] Patent Number: 4,731,881

[45] Date of Patent: Mar. 15, 1988

[54] NARROW SPECTRAL BANDWIDTH, UV SOLAR BLIND DETECTOR

[75] Inventor: Myer Geller, San Diego, Calif.

[73] Assignee: The United States of America as represented by the Secretary of the Navy, Washington, D.C.

[21] Appl. No.: 880,513

[22] Filed: Jun. 30, 1986

[51] Int. Cl.⁴ .............................. H04B 9/00; G01J 1/42
[52] U.S. Cl. ........................................ 455/619; 250/372
[58] Field of Search ................ 455/619; 250/361 R, 250/367, 362, 365, 487.1, 496.1, 372

[56] References Cited

U.S. PATENT DOCUMENTS

| | | | |
|---|---|---|---|
| 2,554,321 | 5/1951 | Bray | 250/362 |
| 3,614,435 | 10/1971 | Halpin | 250/362 |
| 3,891,849 | 6/1975 | Felice et al. | 250/372 |
| 3,903,422 | 9/1975 | Buhrer | 250/372 |
| 4,065,672 | 12/1977 | Harpster | 250/372 |
| 4,286,158 | 8/1981 | Charpak et al. | 250/374 |
| 4,376,892 | 3/1983 | Charpak et al. | 250/372 |
| 4,493,114 | 1/1985 | Geller et al. | 455/617 |

*Primary Examiner*—Joseph A. Orsino, Jr.
*Attorney, Agent, or Firm*—R. F. Beers; E. F. Johnston; T. G. Keough

[57] ABSTRACT

Detection of 253.7 nm radiation in the solar blind UV spectrum is enhanced by using an energy wavelength shifter with a photomultiplier tube which senses fluorescent emissions. A ruby block wavelength shifter has a coating that passes energy including the 253.7 nm radiation and a layer that passes radiation within a bandwidth including the fluorescent emissions. The ruby block absorbs the energy of the 253.7 nm radiation and produces fluorescent emission that passes through the layer. The photomultiplier tube is sensitive to the fluorescent wavelengths to aid in detection. The relatively large coated area provides a wide aperture, wide field of view detection of the 253.7 nm radiation.

3 Claims, 13 Drawing Figures

NARROW SPECTRAL BANDWIDTH, UV SOLAR BLIND DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

UV communication links are receiving greater interest due to some of the advantages of operating in the "solar blind" ultraviolet spectrum. Line-of-sight transmitters and receivers are not required since, within their range, a receiver responds to scattered UV modulated energy. Usually range is quite limited due to the transmission characteristics of UV energy in the atmosphere. A typical UV communication system is shown in U.S. Pat. No. 4,493,114 by Meyer Geller et al entitled OPTICAL NON-LINE-OF-SIGHT COVERT, SECURE HIGH DATA COMMUNICATION SYSTEM.

UV communications systems of this type, however, should have a large area, wide field of view detector to assure acceptable results. As a transmitter radiation may be a single line, 253.7 nm from a mercury discharge, a detector need only be sensitive to a very narrow spectral bandwidth (about 0.02 nm). A typical contemporary UV detector filter, however, has a relatively wide bandwidth of about 40 nm. This permits noise at wavelengths other than the modulated, or information carrying 253.7 nm signal and can present objectionable noise pulses that interfere with reception of the information signal. The waveform of FIG. 1 shows the transmission characteristic of a contemporary UV solar blind filter that is used with an EMR solar blind photomultiplier tube 541 Q. The mercury 253.7 nm discharge line is indicated. It is to be noted that the spectral bandwidth of the filter is needlessly too large for the single line and that the transmissivity of the 2.53.7 nm signal is very low, only about one percent.

In the presence of intense nose sources, such as an arc welder, even a strong mercury line transmission might be masked with the arrangement described immediately above. FIG. 2 shows a typical photon count at the receiver for 253.7 nm signal at a length distance of about 0.7 km. FIG. 3 shows the photon count in a noisy background when an arc welder operates in the vicinity, note the change of scale in FIG. 3 with respect to FIG. 2. It is apparent that the arc welder nose is orders of magnitude larger than the information signal. operations in the presence of such a noise source are nearly impossible. Reducing the bandwidth of the filter to a value not much larger than the 253.7 nm line width might eliminate much of the noise.

Producing a filter having a very narrow width is not without its drawbacks however. FIG. 4 sets out a number of typical materials which, when properly fashioned with appropriate dimensions can decrease the bandwidth and hence aid the signal-to-noise ratio. Unfortunately, large single crystals are required to permit sufficient information gathering. This is particularly the case when nickel sulphate is selected. One of the drawbacks of such larger crystals is that they are difficult to grow and, as a consequence, expensive. Cost and technology obstacles apparently have prevented a wide aperture wide field of view detector needed for UV scattered radiation beyond a very low percent quantum efficiency at the frequency of interest, 253.7 nm.

Thus, there is a continuing need in the state of the art for a detector of 253.7 nm radiation in the solar blind UV spectrum for inclusion in a receiver in an omni-directional nonline-of-sight communication system requiring a large aperture, wide field of view capability.

SUMMARY OF THE INVENTION

The present invention is directed to providing an apparatus and method for improving the detection of 253.7 nm radiation coming, for example, from a mercury discharge source. A wide aperture, wide field of view surface is provided with a coating that blocks some of the radiation outside of the 253.7 nm impinging radiation. A ruby material absorbs the 253.7 radiation and provides fluorescent emissions. A glass layer passes the fluorescent emissions and a photomultiplier tube sensitive to radiation in the fluorescent spectrum gives output signals representative of the impinging radiation. Shifting the 253.7 nm radiation into the fluorescent spectrum allows the use of less expensive photomultiplier tubes.

A prime object of the invention is to provide for an improved detection capability for 253.7 nm radiation.

Another object of the invention is to provide for a wide aperture wide field of view enhanced detector for an omni-directional, nonline-of-sight communication system.

Another object is to provide for an improved apparatus and method for the detection of 253.7 nm radiation that shifts the signal of interest into fluorescent wavelengths.

Yet still another object of the invention is to provide for a 253.7 nanometer detector having increased cost effectiveness.

A further object is to provide for a detector of 253.7 nm radiation that includes ruby material for absorption at 253.7 nm and emission at fluorescent wavelengths.

Another object is to provide for a detector operable in the UV solar-blind spectrum using a ruby material to reduce the possibility of erroneous signals otherwise attributed to interference, such as an arc welder discharge.

These and other objects of the invention will become more readily apparent from the ensuing specification and attached drawings when taken in conjunction with the appended claims.

DESCRIPTION OF THE PREFERRED EMBODIMENT

Figure 1:
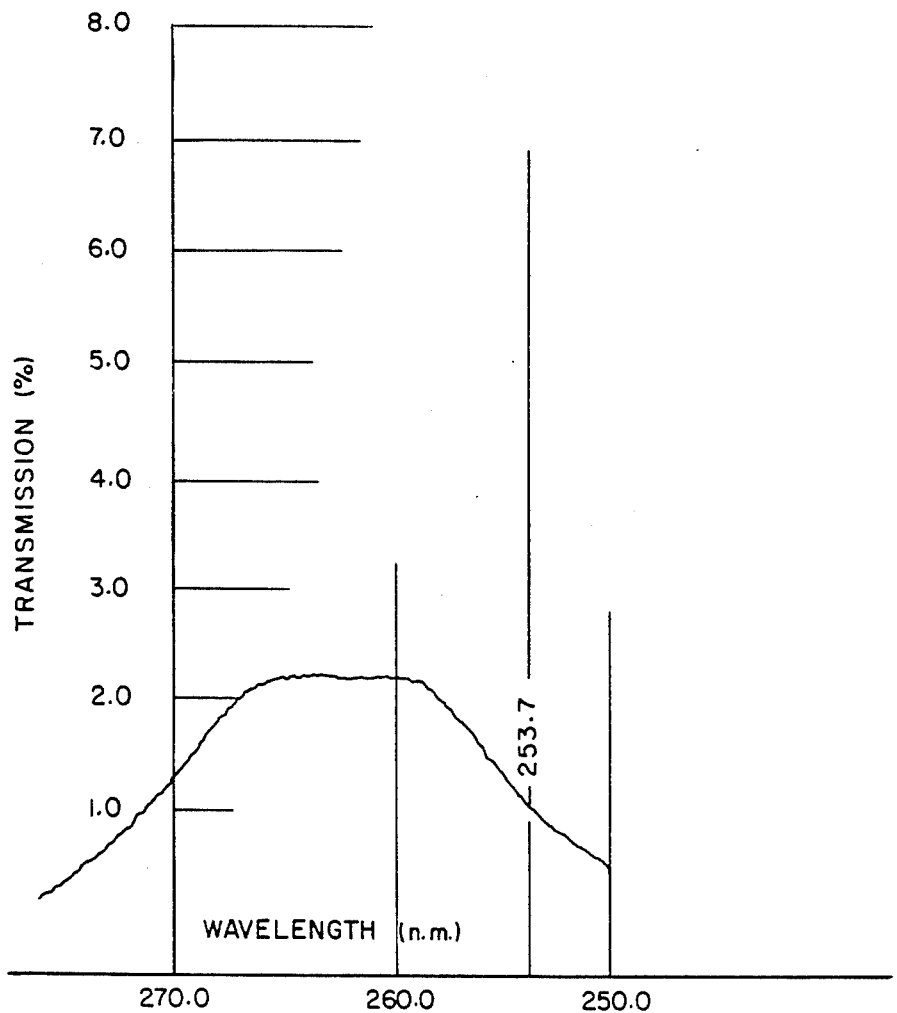
FIG. 1 shows a percentage transmission of a state of the art UV solar blind filter that is used with an EMR solar blind PMT 541 Q and indicates the mercury 253.7 nm line.
Figure 2:
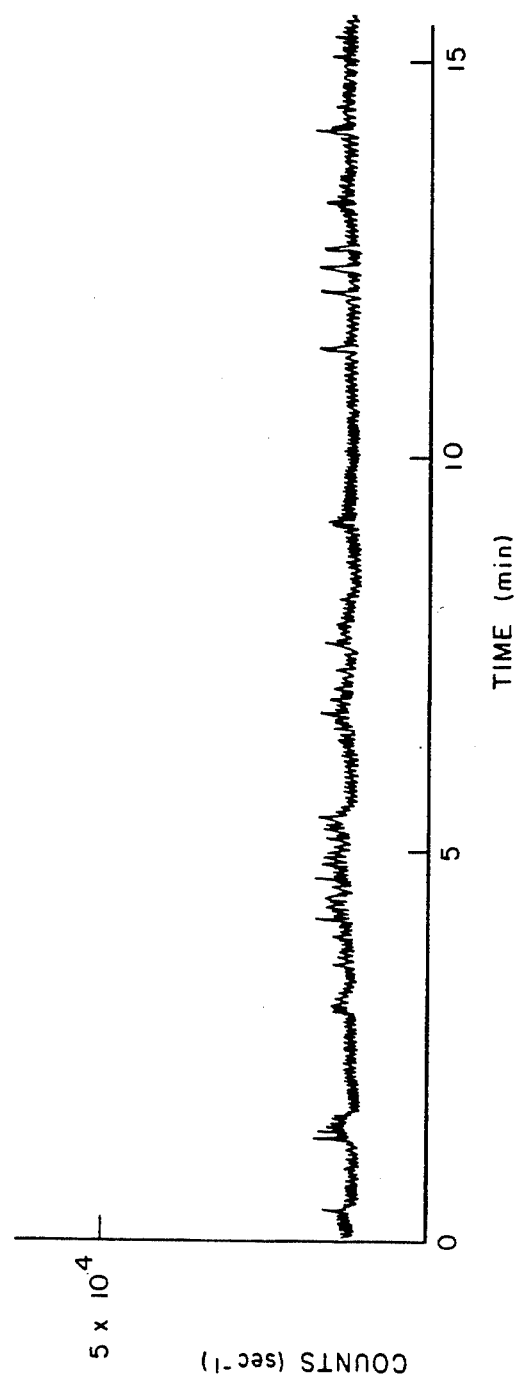
FIG. 2 is a graphical representation of the received 253.7 nm radiation at a range distance of 0.75 km with a 20 nm bandwidth filter.
Figure 3:
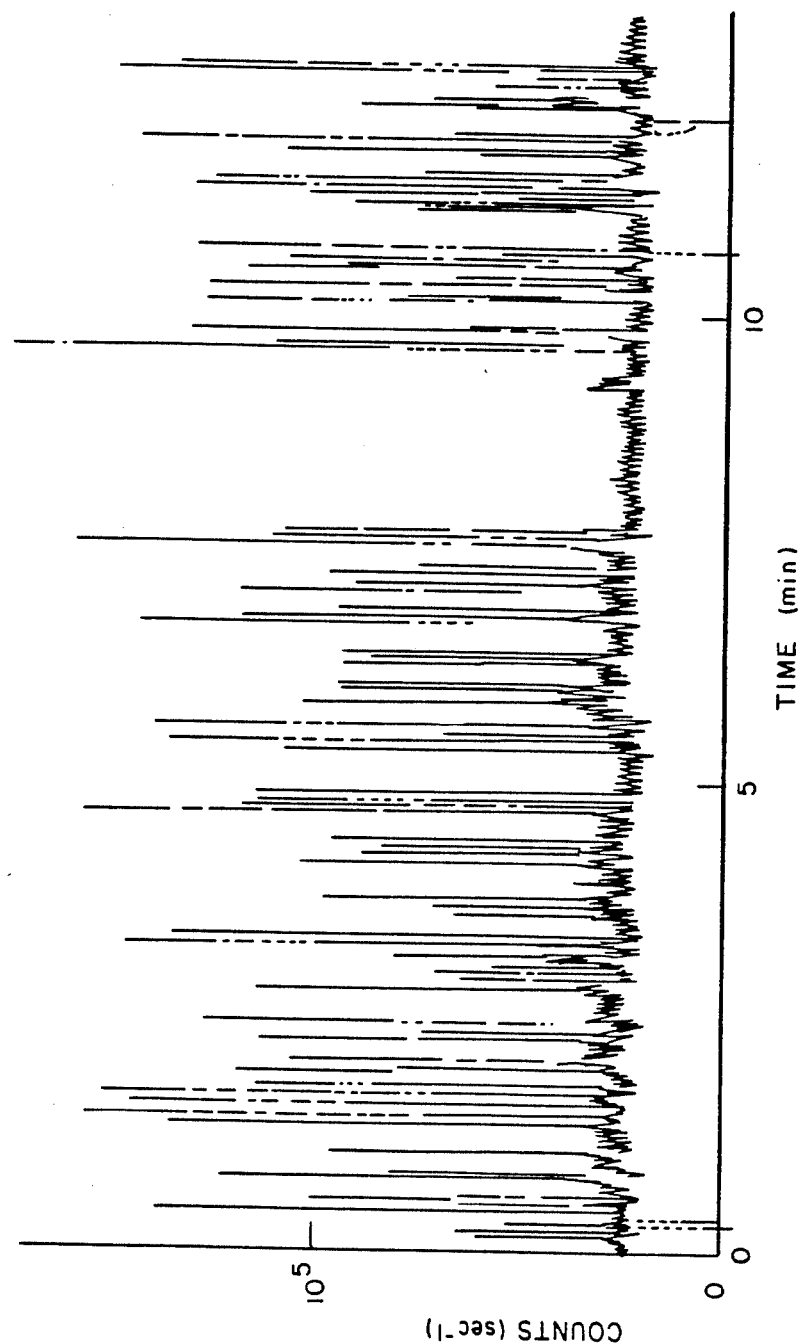
FIG. 3 shows a 40 nm filter passband at 0.75 km when an arc welder operates in the vicinity, note the change of scale between FIGS. 2 and 3.
Figure 4:
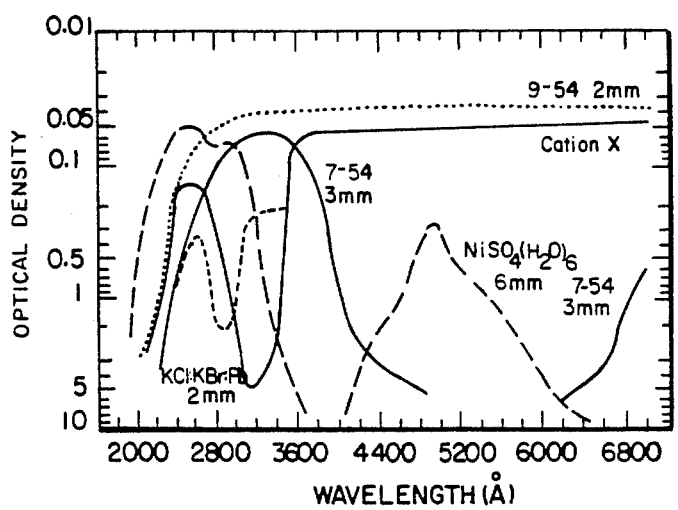
FIG. 4 depicts typical absorption bandpass filter materials with optical densities of typical samples of nickel sulphate hexahydrate crystal, cation X in polyvinyl alcohol, lead-doped potassium chloride-potassium bromide crystal, and Corning filters 9-54(7910) and 7-54(9863).
Figure 5:
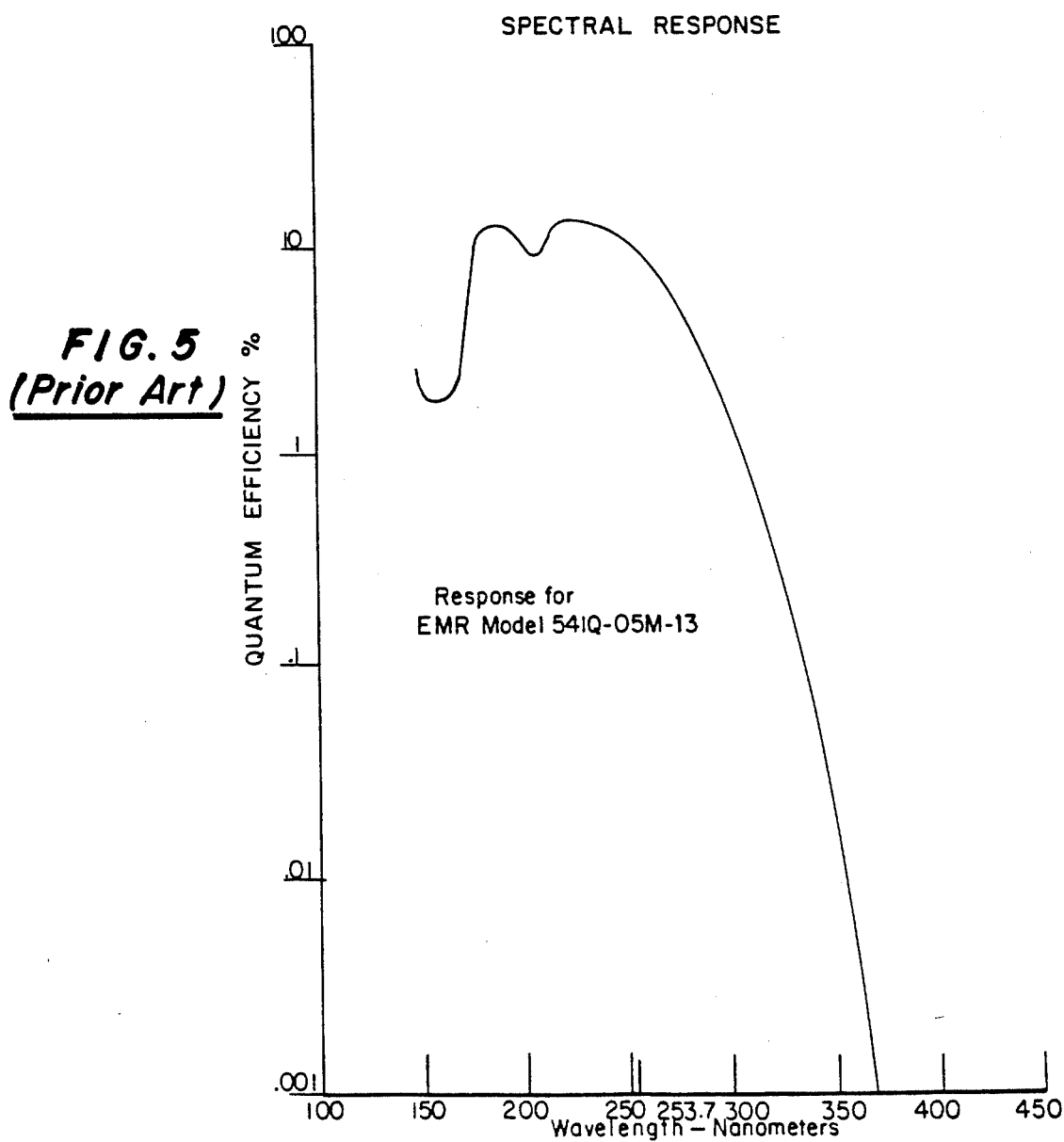
FIG. 5 shows the quantum efficiency characteristic of a prior art EMR tube having a ten per cent efficiency at the wavelength of interest.
Figure 6:
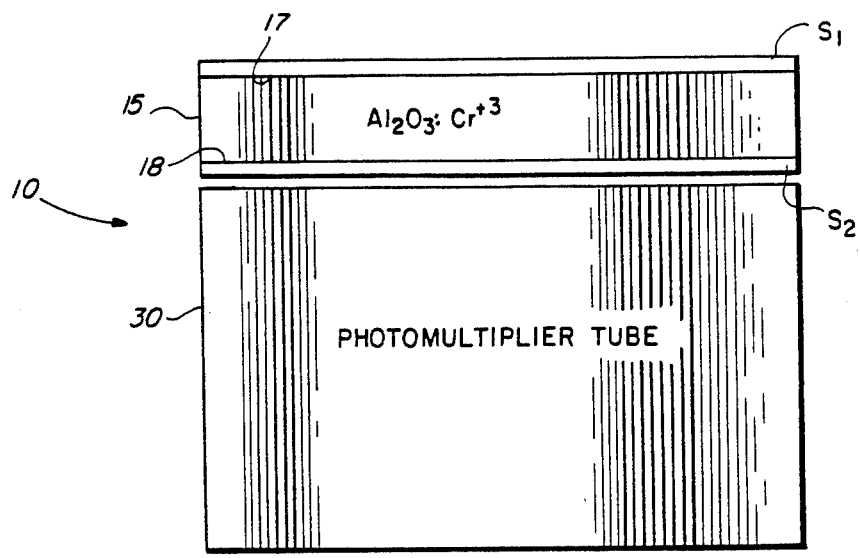
FIG. 6 is a schematic diagram of the improved efficiency detector for 253.7 nm radiation.
Figure 7A:
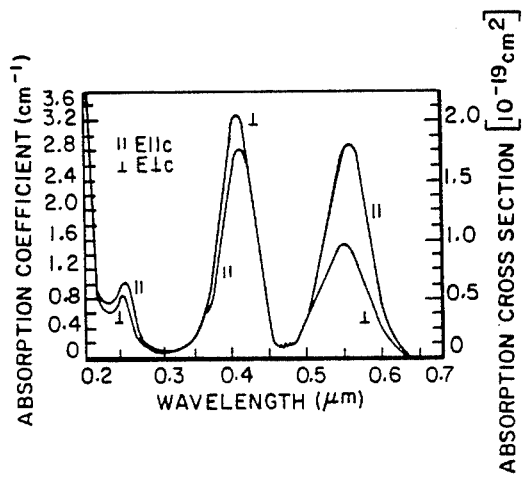
FIGS. 7a,b,c,d and e are graphical representations of the effects of changing thickness and doping in ruby material in the wide aperture, wide field of view detector.
Figure 7B:
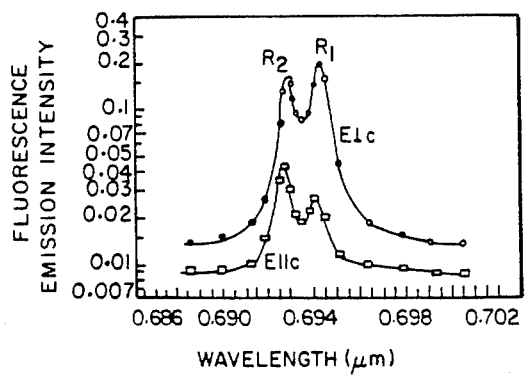
Figure 7C:
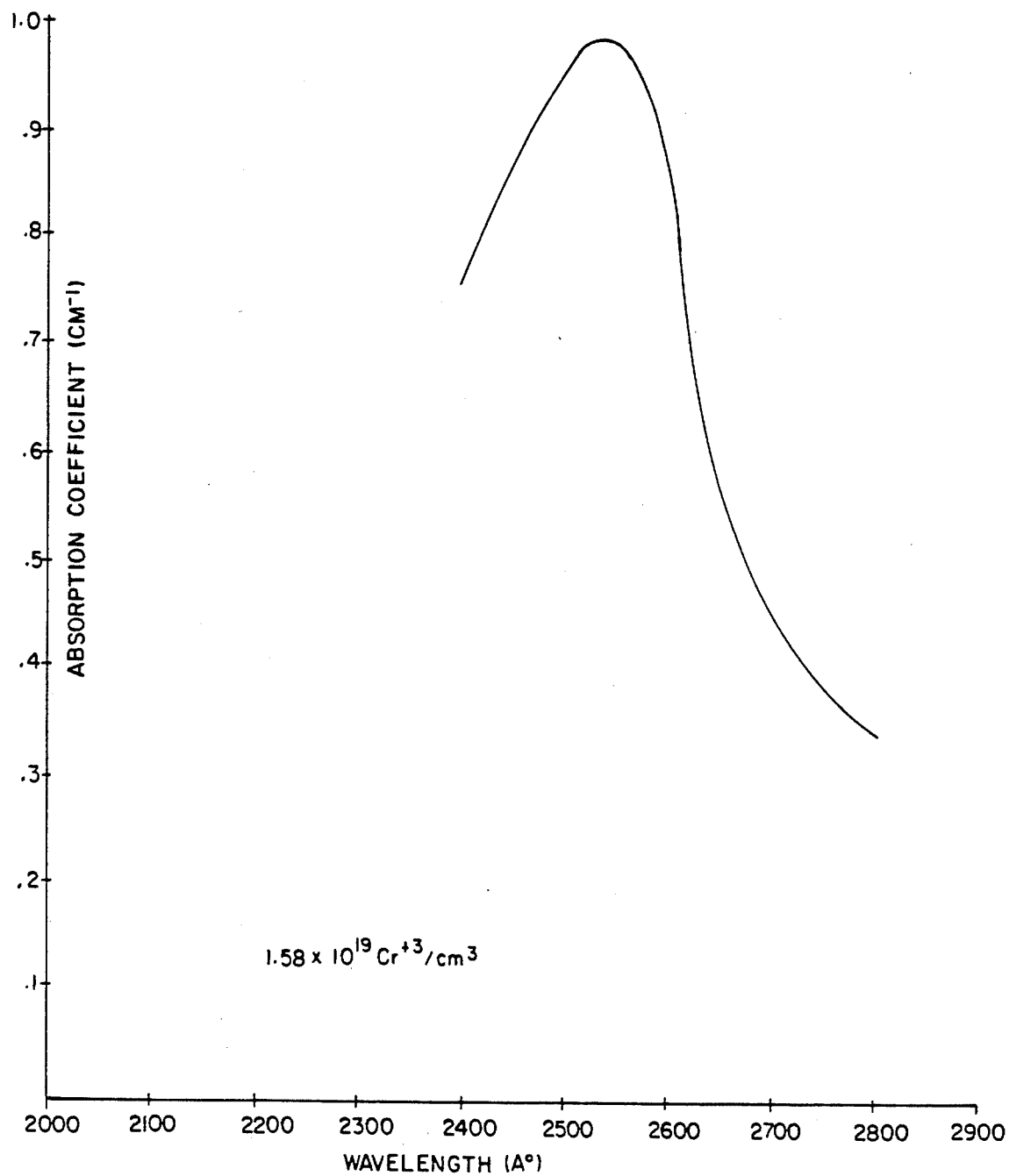
Figure 7D:
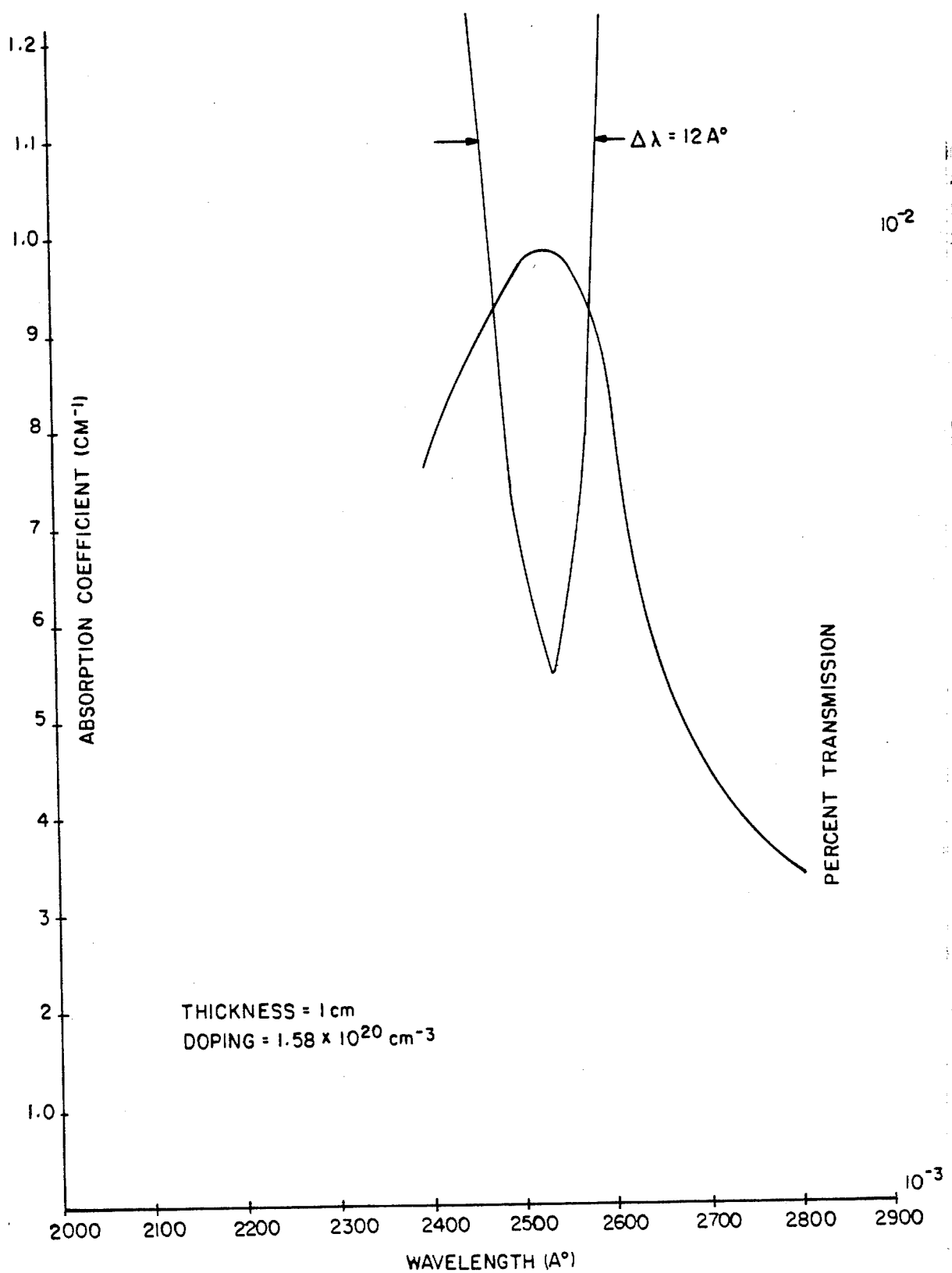
Figure 7E:
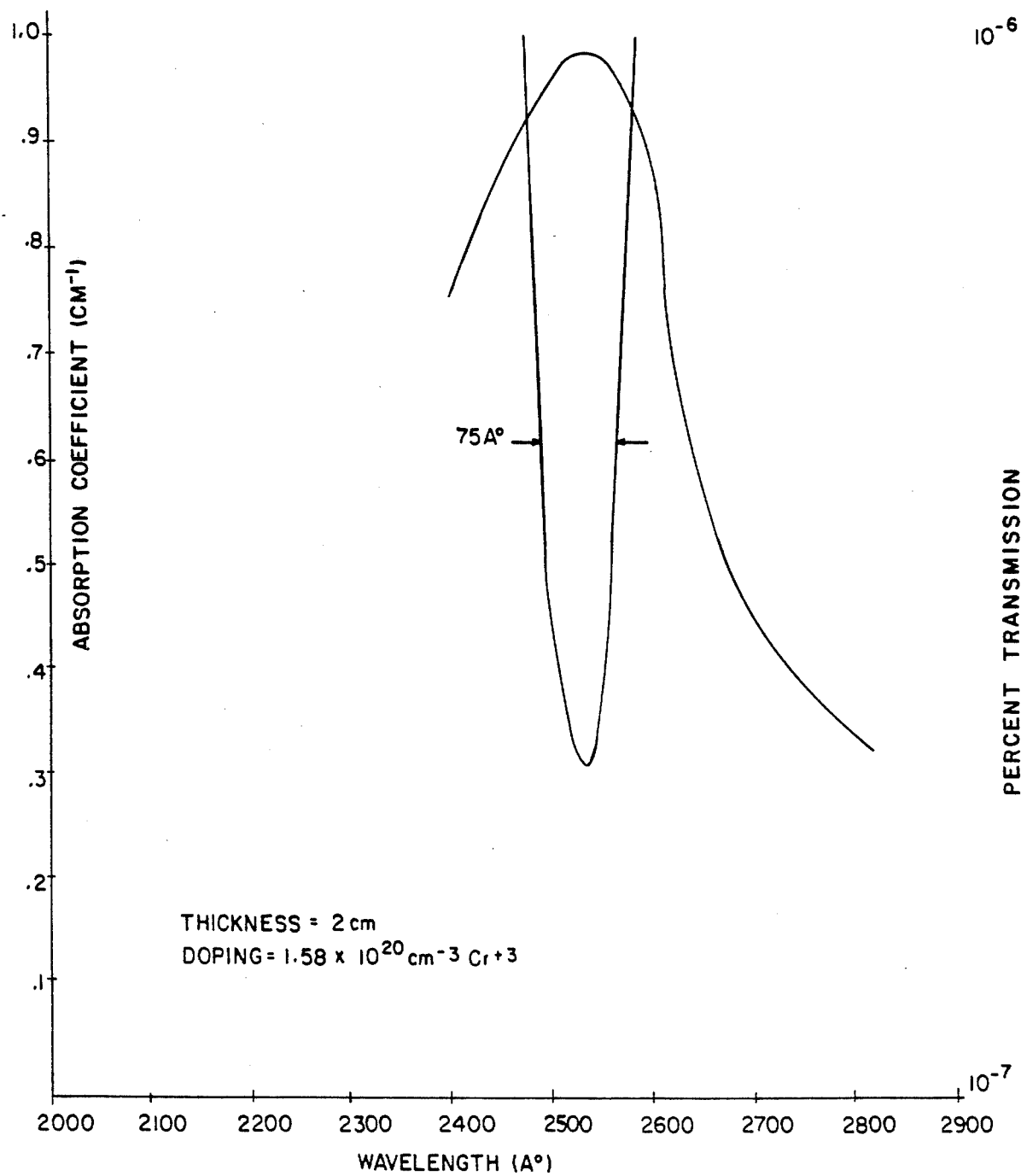

Referring now to the drawings and in particular to FIG. 6 an improved detector 10 of 253.7 nm radiation includes a pillbox-shaped block 15 held adjacent to a photomultiplier tube 30. The pillbox-like block is fabricated from ruby ($Al_2O_3:C_r^{+3}$). Ruby is established as a material having an absorption coefficient, an absorption crosssection and fluorescence emission intensity as shown in FIGS. 7a and 7b.

Figure 8A:
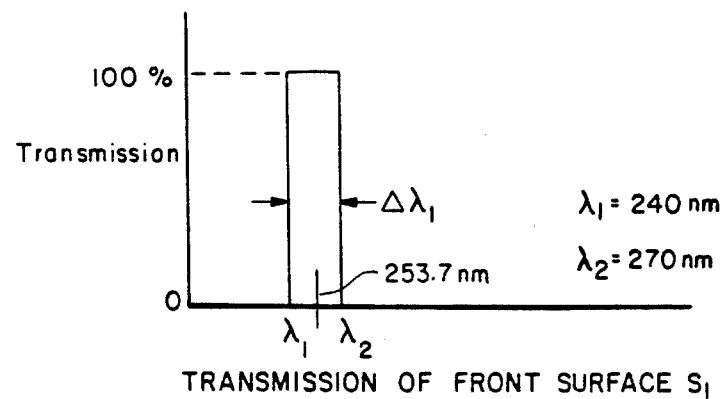
FIGS. 8a and 8b depict the transmission passband characteristics of coating S1 and layer S2.

An upper surface 17 of block 15 is provided with a coating $S_1$ which passes only a spectral region $\Delta\lambda_1$ that lies between $\Delta_1$ and $\Delta_2$, see FIG. 8a. The transmission characteristic is depicted as being square in shape. This is for purposes of demonstration only, it being realized that a certain amount of curvature is inherent. The coating can be a laminate of a first layer which has a low pass characteristic and a second layer which has a high pass characteristic. Both of these characteristics are known to be curved, however; for purposes of clarification, the passband is depicted as being square to narrowly encompass 253.7 nm radiation. The width of this passband is shown to range from 240 nm to 270 nm for example.

Coatings having a bandwidth capability as called for above are well within the purview of the current state of the art. Numerous laboratories provide such coatings by conventional vapor deposition techniques once the desired passbands are known. A typical laboratory having such a capability is the Optical Coating Laboratory Incorporated in Santa Rosa, Calif. This laboratory routinely provides such coatings upon request. Other laboratories are readily available nationwide to provide similar services.

Figure 8B:
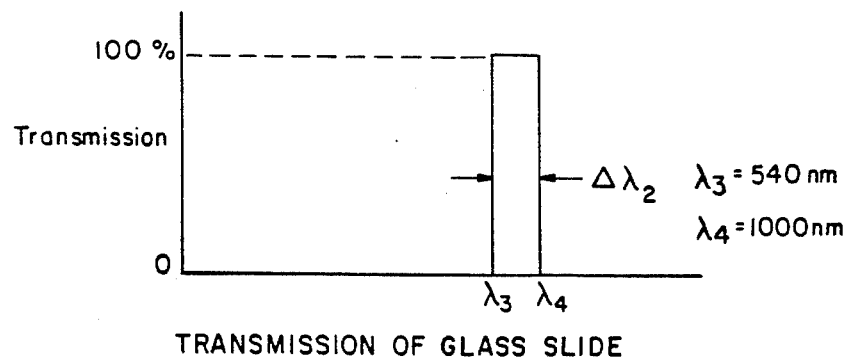

A layer $S_2$ is shown adjacent surface 18 and transmits a spectral bandwidth of $\Delta\lambda_2$ which encompasses all emitted fluorescent photons but does not overlap the passband $\Delta\lambda_1$ see FIG. 8b. In this case the bandwidth may span a range of the 540 nm and 1000 nm fluorescent radiation. Layer $S_2$ is glass, a suitable type glass layer is one commercially marketed under the tradename PYREX. It blocks the radiation of the passband $\Delta\lambda_1$, but passes the radiation of passband of $\Delta\lambda_2$. To restate, the transmission bands $\Delta\lambda_1$ and $\Delta\lambda_2$ do not overlap so that the block is completely opaque to all wavelengths incident on it. However, by reason of the ruby material forming the block, a shift of wavelength is provided from that of the incident radiation 253.7 nm to fluorescent wavelengths of within $\Delta\lambda_2$. In other words, photons that enter the ruby block in the spectral region of $\Delta\lambda_1$ are shifted into the wavelength region $\Delta\lambda_2$. Photomultiplier tube 30 is responsive to this fluorescent radiation and produces representative output signals.

The passband of $\Delta\lambda_1$ is chosen to reduce the effects of some radiation outside of the 253.7 nm radiation, yet its passband characteristic must be such as to pass the 253.7 nm radiation with little or no attenuation. The photons of energy that pass through coating $S_1$ are shifted to a longer wavelength by the frequency shifter coaction attributes to the ruby material. By increasing the thickness of the ruby block and/or increasing the concentration of $Cr^{+3}$ the absorption coefficient increases in an absorption band of small spectral bandwidth with large values of absorption at 253.7 nm. Thus, the ruby functions as a spike filter and fluoresces at the wavelengths shown in FIG. 7b.

The fluorescent bandwidth of $\Delta\lambda_2$ is removed from the information modulated 253.7 nm signal in bandwidth of $\Delta\lambda_1$. This passband shifting places the bandwidth for discrimination, $\Delta\lambda_2$, in a frequency range in which photomultipliers may have an inherently higher quantum efficiency. Typically, a GaAs PMT by RCA (Model 128) can be used as PMT 30. It has an over 10% quantum efficiency in the fluorescent bandwidth discussed.

The ruby material acts as a frequency converting medium. The 253.7 nm radiation is absorbed and effects a transition to a longer wavelength. Since the absorption process has a narrow line width, about the 253.7 nm line of a mercury lamp discharge, many noise photons at other wavelengths are not absorbed. This phenomena discriminates against noise photons and eliminates them from interfering with the information content of the 253.7 nm signal.

Elimination of energy photons by coating $S_1$ in and by itself contributes to the more efficient operation of the detector. The wide area presented by coating $S_1$ provides a wide aperture wide field of view capability which increases the operational capability of the communication system that is responsive to non-line-of-sight backscattered radiation. Shifting the 253.7 nm radiation to the fluorescent spectrum and passing this energy through the layer $S_2$ assures that none of the spurious signals which might otherwise appear in the solar blind UV spectrum affect the output signal from the photomultiplier tube. The fluorescent radiation which is shifted from the information carrying 2.357 nm radiation effects the output signal of the photomultiplier tube. Cost effectiveness is assured by substitution of the fluorescent band radiation sensitive PMT as opposed to the UV spectrum PMT. (Fluorescent sensitive PMT's are less complicated to fabricate and, as a consequence, their per unit costs are reduced.)

The relatively large area of coated surface $S_1$ in the neighborhood of several square centimeters, provides a wider aperture, wide field of view receptive surface to information carrying 253.7 nm radiation. This feature in conjunction with the others immediately described further enhances the efficiency and operational capability of the detector to make non-line-of-sight, backscattered communications more feasible. The narrow bandpass features of $S_1$ and $S_2$ blank radiation from impinging directly on PMT 30 and do away with the interfering radiation normally associated with an arc welder discharge. As a consequence, greater reliability for the reception of mercury discharge radiation is improved.

Obviously, many modifications and variations of the present invention are possible in the light of the above teachings. It is therefore to be understood that within the scope of the appended claims the invention may be practiced otherwise than as specifically described.

What is claimed is:

1. An apparatus for improving detection of an information signal within the solar blind UV spectrum comprising:

means for amplifying impinging radiation that is in a passband outside of the solar blind UV spectrum to produce a representative output signal; and means disposed adjacent the impinging radiation amplifying means to receive the information signal for shifting the wavelength of the received information signal to the passband of the impinging radiation, the wavelength shifting means is provided with a coating to pass the information signal wavelength and a layer to pass the impinging radiation passband, said layer has a passband that does not overlap the passband of the coating, the wavelength shifting means is provided with a first area surface that is covered by the coating to provide a wide area, wide field of view detection of the information signal, a second area surface that is covered by the layer and is disposed adjacent the impinging radiation amplifying means and a volume between the first area surface and second area surface filled with a material responsive to absorb radiation of the information signal to transition to a longer wavelength and to provide fluorescent emission within the passband of the impinging radiation, the material is ruby otherwise known as Chromium doped sapphire ($Al_2O_3$:$Cr^{3+}$), the information signal wavelength is 253.7 nm and the passband of the received information blocks radiation beyond 240 nm to 270 nm.

2. An apparatus according to claim 1 in which the impinging radiation amplifying means is a photomultiplier tube sensitive to the fluorescent emission in the passband of the received information.

3. A method of improving the detection efficiency of an information signal within the solar blind UV spectrum comprising:

blocking out signals other than a passband including the information signal;

shifting the frequency of the information signal to a bandwidth outside of the solar blind UV spectrum;

blocking out signals other than the bandwidth outside of the solar blind UV spectrum and amplifying the signals within the bandwidth, the shifting includes the transition of wavelengths to longer wavelengths and the transition includes locating a ruby block to receive the information signal passband to assure the transition to the longer wavelengths of fluorescent emission.

* * * * *